United States Patent [19]

Libert

[11] Patent Number: 4,533,377
[45] Date of Patent: Aug. 6, 1985

[54] NECK RING MECHANISM FOR I.S. GLASS FORMING MACHINE

[75] Inventor: Harold C. Libert, Union City, Ind.

[73] Assignee: Maul Technology Corporation, Millville, N.J.

[21] Appl. No.: 606,545

[22] Filed: May 3, 1984

Related U.S. Application Data

[63] Continuation-in-part of Ser. No. 572,478, Jan. 20, 1984, abandoned.

[51] Int. Cl.³ .............................................. C03B 9/44
[52] U.S. Cl. ...................................... 65/232; 65/235; 65/236; 65/260; 91/409; 91/470; 91/534; 92/2; 92/31
[58] Field of Search ................. 65/232, 235, 239, 241, 65/236, 260; 92/2, 31; 91/409, 470, 534

[56] References Cited

U.S. PATENT DOCUMENTS

| | | | |
|---|---|---|---|
| 2,702,444 | 2/1955 | Rowe | 49/9 |
| 2,806,449 | 9/1957 | Simmons | 91/534 X |
| 3,233,999 | 2/1966 | Mumford | 65/235 X |

FOREIGN PATENT DOCUMENTS 1439499  6/1976  United Kingdom ..................... 92/31

Primary Examiner—Arthur Kellogg
Attorney, Agent, or Firm—Seidel, Gonda, Goldhammer

[57] ABSTRACT

A neck ring mechanism for transferring a blank or parison from a blank mold section to a blow mold section of an I.S. glass forming machine includes a rock shaft and a pair of spaced cylinders reciprocable in opposition directions on the shaft. The rock shaft is provided with a plurality of longitudinal grooves, and a like plurality of followers are arranged in the grooves so as to contact at least one side wall of each groove. The followers are supported on each cylinder. One or more piston rings are seated in associated annular grooves in the rock shaft so as to preclude air leakage.

16 Claims, 7 Drawing Figures

NECK RING MECHANISM FOR I.S. GLASS FORMING MACHINE

This application is a continuation-in-part, of application Ser. No. 572,478, filed Jan. 20, 1984, now abandoned.

BACKGROUND OF THE INVENTION

The present invention is directed to a neck ring mechanism for transferring one or more preforms, also known as blanks or parisons, from the blank mode section of an I.S. machine to the blow mold section. The mechanism transfers the neck mold holder arms over 180° so as to perform the invert function.

Neck ring mechanisms are well-known in the art. For example, U.S. Pat. No. 3,762,907 issued to Quinn et al. provides a general description of such a mechanism wherein a molten glass gob is delivered to the blank mold section of the I.S. machine. The molten gob is subjected to an air discharge so as to force the molten glass into a split neck mold and around a plunger. The plunger is then retracted, and counter blow air is introduced into the depression left by the plunger so as to form a parison. The neck ring mechanism then transfers the parison to the blow mold section, inverting the parison in the process so that the mouth of the parison is supported by the neck mold. The neck mold sections are then separated so that the parison is left hanging in the blow mold. The neck mold holder arms are returned 180° to the blow mold section, and the parison is reheated and blown to final shape in the blow mold section.

A particular neck ring mechanism for performing this function is described in U.S. Pat. No. 2,072,444 issued to Rowe. The mechanism described in that patent includes a splined rock shaft and a pair of spaced cylinders which mate with the splined shaft so that the cylinders are reciprocable in opposite directions parallel to the shaft axis. Each neck mold holder arm is supported on a T-shaped track located on a cylinder outer surface. A piston is pinned to the rock shaft so as to seal the gap between the cylinders and form an air chamber therebetween. Air is introduced in the chamber through an axial bore in the rock shaft so as to move the cylinders in opposite directions against associated bias springs. As the cylinders move apart, the neck mold holder arms move apart and the neck mold sections separate thereby releasing the parison. The invert function is accomplished by a rack driven gear coupled to the rock shaft. The gear is oscillated by the rack so as to transfer the neck mold support arms back and forth over 180° between the blank mold and blow mold sections of the machine.

Misalignment of the cylinders due to backlash is a recurring problem at the neck ring mechanism. Thus, backlash between the cylinders and th splined rock shaft produces a rotational misalignment of the cylinders and corresponding misalignment of the neck molds. The problem worsens as the shaft splines wear.

Moreover, the splined rock shaft and piston assembly permit objectionable air leakage between the cylinders which may result in incomplete opening of the neck molds. As the shaft splines wear, this problem also worsens.

It is an object of the present invention to provide a neck ring mechanism wherein the cylinder backlash can be easily compensated.

Another object of the invention is to provide a neck ring mechanism wherein air leakage between the cylinders is substantially eliminated.

Other objects and advantages of the invention appear hereinafter in the following disclosure.

BRIEF SUMMARY OF THE INVENTION

A neck ring mechanism for use in a I.S. glass forming machine wherein a pair of spaced cylinders are reciprocable on a rock shaft in opposite directions. The cylinders are mouned on the rock shaft by a plurality of follower mechanisms which extend into a like plurality of longitudinal grooves formed in the rock shaft periphery at spaced radial locations. Each follower mechanism is provided with a follower eccentrically mounted on a stem secured to the cylinder by means of a nut. Each follower is adjusted so as to contact one groove sidewall while being offset from the other sidewall. As the cylinders reciprocate to open the neck mold sections, the follower moves along the contacted sidewall. As the rock shaft oscillates to invert the neck molds, each follower stays in contact with its associated sidewall, retaining the cylinders in rotational alignment. Preferably, the groove sidewalls are hardened to minimize wear. Any misalignment of the cylinders due to wear of a sidewall is easily compensated by adjusting the follower mechanism so that the follower remains in contact with the sidewall. One or more piston rings are seated in annular grooves provided in the rock shaft. The piston rings seal the interface between the rock shaft and cylinder so as to prevent air leakage at the interface.

For the purpose of illustrating the invention, there is shown in the drawings a form which is presently preferred; it being understood however, that this invention is not limited to the precise arrangements and instrumentalities shown.

DETAILED DESCRIPTION OF THE INVENTION

Figure 1:
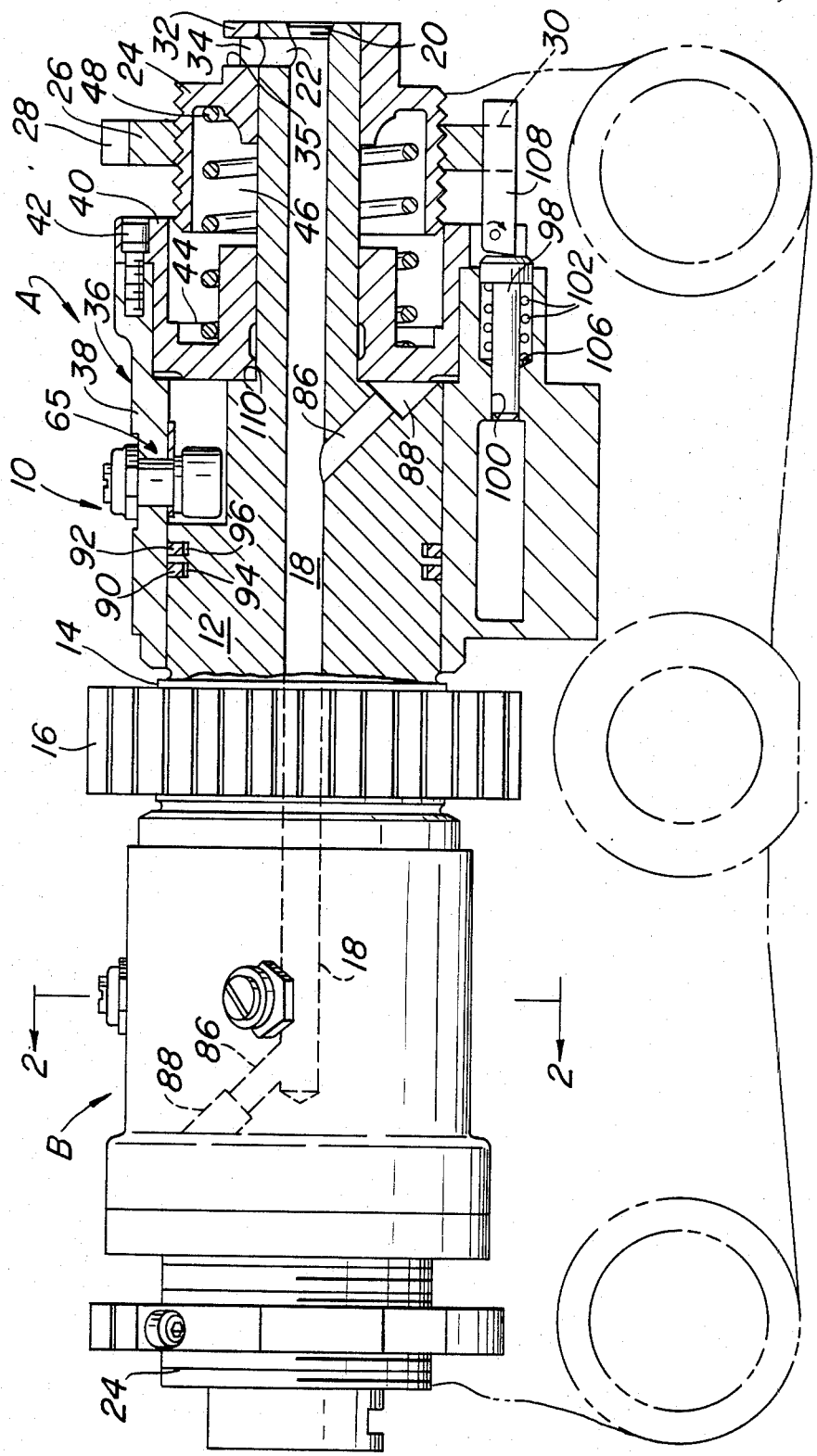
FIG. 1 is a partial section of the neck ring mechanism of the present invention.
Figure 4:
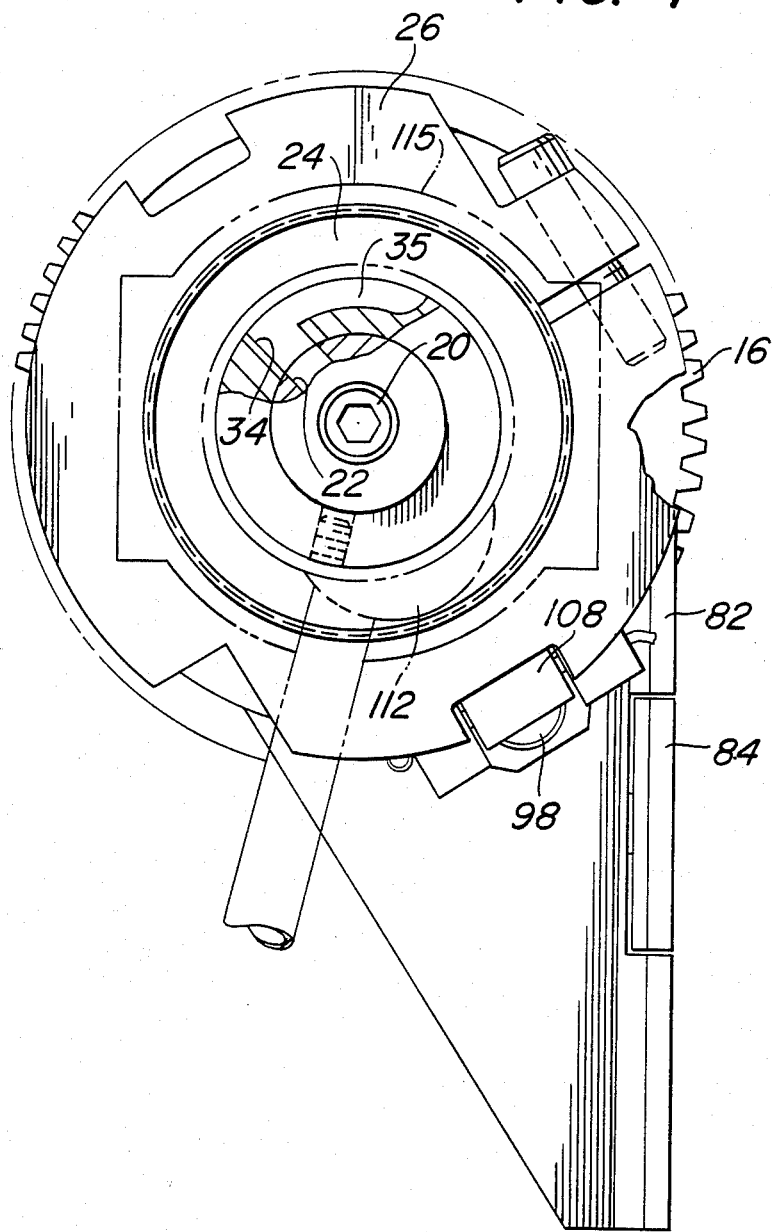
FIG. 4 is an end view of the neck ring mechanism and partial bearing structure.

Referring to the drawings in detail wherein like numerals indicate like elements, there is shown in FIG. 1 a neck ring mechanism 10 according to the present invention. The neck ring mechanism 10 comprises like sections A, B. Accordingly, description of section A herein is understood to apply as well to section B. The neck ring mechanism includes a rock shaft 12 which is supported horizontally at its ends in conventional bearings 115 (FIG. 4) which are well known to the artisan. The rock shaft includes a medial portion 14 on which a toothed gear 16 is mounted. The gear is driven over 180° in forward and reverse directions by a conventional drive mechanism such as described in U.S. Pat. No. 2,072,444 at column 11 et seq.

The rock shaft 12 is provided with an axial bore 18 which extends through section A but terminates in section B. The open end of the bore in section A is sealed by a plug 20. A bore 22 extends from the periphery of the rock shaft to bore 18 proximate plug 20. A threaded collar 24 is pinned to the end portion of the rock shaft for rotation therewith. An adjustable cylinder stop in the form of a nut 26 is threaded on collar 24. The nut is provided with diametrically opposed slots 28, 30 for purposes described hereinafter. Collar 24 has a reduced portion which is provided with an annular slot 35. The slot extends over an arc of approximately 60°. The slot is provided with a radial bore 34 which is coupled by bore 22 to bore 18.

A cylinder 36 surrounds rock shaft 12 between gear 16 and collar 24. Cylinder 36 includes sections 38, 40 which are secured together by means of a bolt 42. Cylinder section 40 and collar 24 are provided with facing annular wells, 44, 46 respectively. A helical spring 48 is seated in wells 44, 46, bearing against the well bottom surfaces. Thus, spring 48 biases the cylinder 36 towards gear 16.

The rock shaft 12 is provided with a plurality of longitudinally extending grooves 50, 52, 54, 56 at spaced radial locations along the shaft periphery. See FIG. 2. Cylinder section 38 is provided with a plurality of bores 58, 60, 62, 64 which are aligned with grooves 50, 52, 54, 56. A follower mechanism 65, 67, 69, 71 extends through each bore 58, 60, 62, 64. For reasons described hereinafter, followers 65, 69 and 71 are adjustable, but follower 67 is not. Each follower mechanism is secured to cylinder section 38 by a washer 68, lock nut 70, and adapter 72. The adapter is provided with a generally semi-circular cross-section having, for example, a two inch radius of curvature to match the curvature of the interior surface of cylinder section 38.

Each follower mechanism includes a follower 74 which is eccentrically mounted on a stem 76 having a threaded end portion 77. The end portion of 76 each follower 65, 69 and 71 is machined to permit rotation of the stem by means of a tool such as a screwdriver or wrench.

Followers 65, 67, 69 and 71 are initially positioned by turning cylinder section 38 on rock shaft 12 so as to bring follower 74 of follower mechanisms 67 into contact with side wall 78 of the associated groove 54. The roller may be offset for example by approximately 1 mil from the opposite groove sidewall 80. Stems 76 of followers 65, 69, 71 are then turned to move their followers 74 into contact with sidewalls 78 of the associated grooves 52, 56, 58. Preferably, the sidewalls of each groove are hardened so as to resist wear, although some wear is inevitable. As a contacted sidewall experiences wear, a clearance forms between the sidewall and the associated follower 74 thereby producing cylinder backlash. The clearance can be closed and the backlash eliminated by turning the stems 76 of mechanisms 65, 69 and 71 so as to swing the follower 74 about their associated stem axes back into contact with their associated groove side walls 78.

Figure 2:
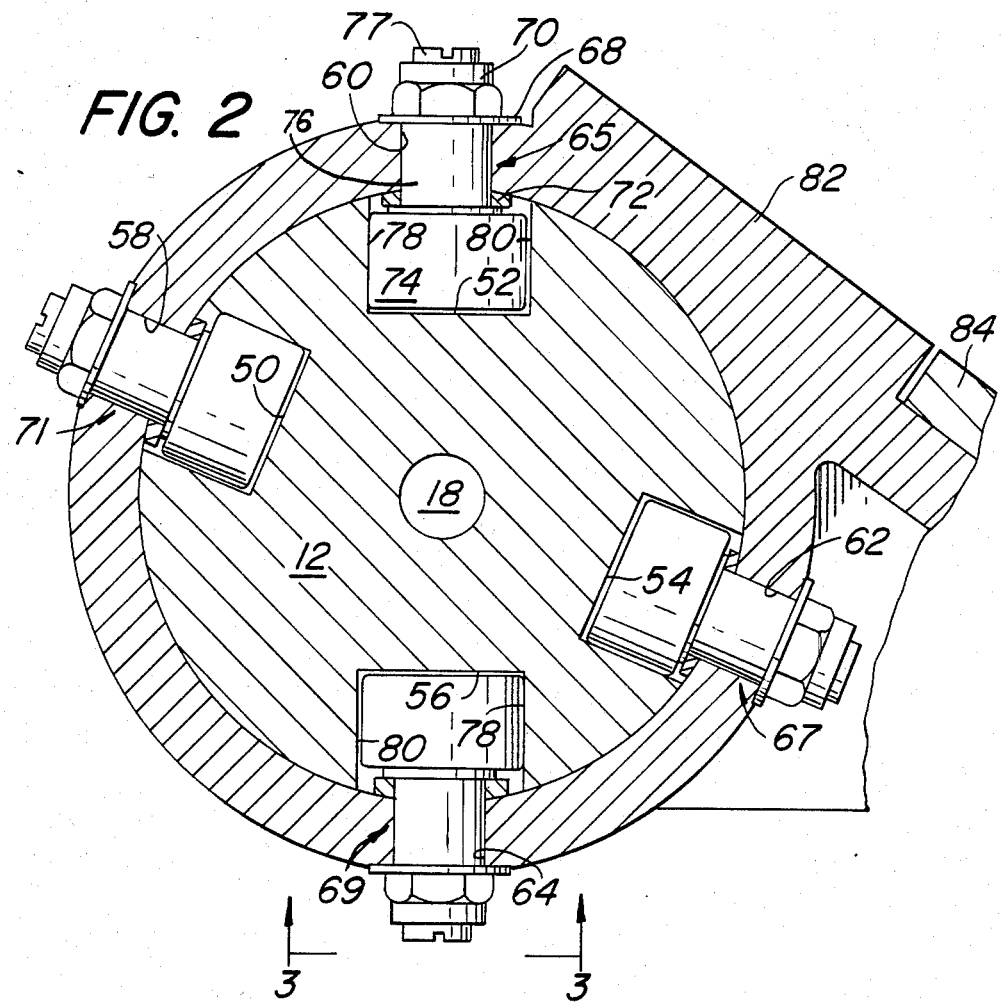
FIG. 2 is a section taken along 2—2 in FIG. 1.

Preferably, grooves 50, 52, 54, 56 are arranged in pairs as shown in FIG. 2. For example, grooves 50, 52 are spaced by approximately 70°, and are arranged diametrically opposite grooves 54, 56 which are also spaced by approximately 70°. The followers 74 contact adjacent groove sidewalls 78 of each pair as shown in FIG. 2 so as to lock cylinder section 38 in position without backlash as the rock shaft oscillates over 180°.

Figure 3:
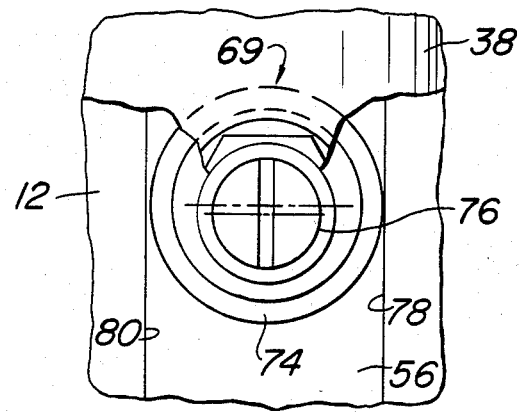
FIG. 3 is a section taken along 3—3 in FIG. 2.
Figure 5:
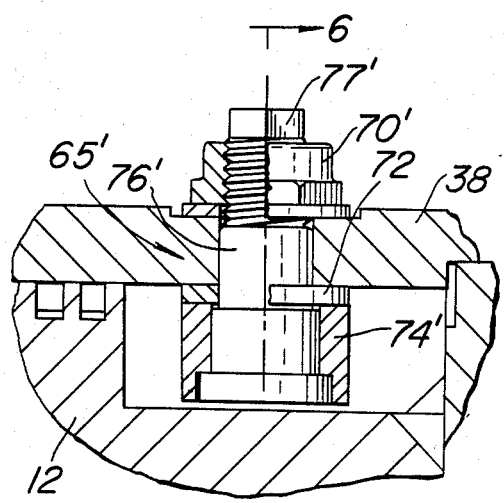
FIG. 5 is a partial section showing an alternate embodiment of the follower.
Figure 6:
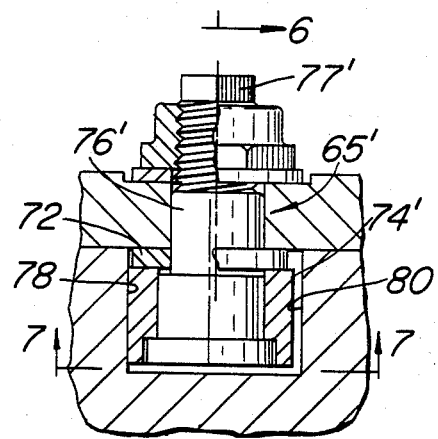
FIG. 6 is a section taken along 6—6 in FIG. 5.
Figure 7:
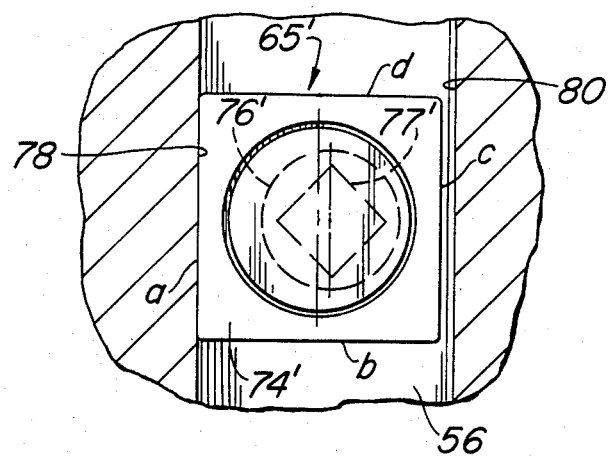
FIG. 7 is a section taken along 7-7 in FIG. 6.

As shown in FIGS. 2 and 3, each follower mechanism may be a conventional McGill CFE-1 follower mechanism wherein the follower 74 is a roller which is eccentrically mounted on stem 76. The roller rollably contacts its associated sidewall 78. Contact between the outer surface of the roller and its associated sidewall 78 at any instant of time occurs along a line extending along the height of the roller. If sidewall 78 is not hardened, line contact between the roller and sidewall may result in peening of the sidewall as a result of repeated oscillation of the rock shaft over extended periods of time. The problem may be alleviated by hardening the sidewall or by employing a follower mechanism 65', 67', 69', 71' which utilizes a follower 74' in the form of a slide block as shown in FIGS. 5, 6 and 7. Slide block 74' is eccentrically mounted on the stem 76'. For each follower mechanism 65', 69', 71', stem 76' is initially turned to move a face or side (a, b, c, d) of the follower into slidable contact with its associated sidewall 78 so that the followers 74' contact their associated sidewalls in the arrangement shown in FIG. 2. The followers thereby lock cylinder section 38 in angular position on the rock shaft. Contact between a follower face and its associated sidewall at any instant of time occurs along an area defined by the follower face. The forces developed during oscillation of the rock shaft are therefore distributed over that area. This eliminates the peening problem. Any clearance which forms between a contacted sidewall and its associated follower face during use can be closed by turning the stem so as to move the follower face back into contact with the sidewall.

Each cylinder section 38 is a single piece casting having a support section 82 to which the neck mold holder arm (not shown) is attached in conventional manner. For example, a T-nut 84 is provided along a medial portion of the support section, and the neck mold holder arm is provided with a mating groove so as to seat on the T-nut.

Rock shaft 12 is provided with a canted bore 86 having an enlarged outlet 88 adjacent the face of cylinder section 40. Bore 86 communicates with bore 18. A pair of piston rings 90, 92 are seated in spaced annular grooves 94, 96 formed in the periphery of rock shaft 12. The piston rings prevent air leakage at the interface of cylinder section 38 and rock shaft 12.

A plunger 98 is seated in the reduced portion 100 of a chamber 102 formed in cylinder section 38. The stem of the plunger is surrounded by a helical spring 104 which butts up against a chamber shoulder 106 and the underside of the plunger cap. The plunger cap contacts the chamfered end of a pivotable latch 108 mounted on cylinder section 40. The plunger maintains the latch in a slightly raised position with respect to the horizontal so that the latch extends through slot 30 in stop nut 26.

Pressurized air is introduced in axial bore 18 via bores 34, 22 as described hereafter. The air exits rock shaft 12 via bore 86 and outlet 88, urging the cylinders 36 away from each other. As a result, the neck mold holder arms, which are coupled to cylinders 36, move away from each other thereby opening the neck molds. The extreme open position of the neck molds is limited by the position of stop nuts 26. If it is desired to vary the amount by which the neck molds open, latch 108 is pivoted clockwise against the return force of plunger 98 so as to remove the latch from slot 30. Nut 26 is then turned so as to advance the nut towards the left (to reduce the amount by which the neck molds open) or right (to increase the amount by which the neck molds open). Slot 28 or 30 is then brought into alignment with latch 108, and the latch is released. Plunger 98 snaps the latch into the slot thereby securing nut 26 in position.

As gear 16 is first driven, rock shaft 12 rotates 180° so as to transfer the neck molds from the blank mold section to the blow mold section. At the end of 180° rotation, annular slot 35 moves in front of a stationary port 112 in the shaft bearing 115. See FIG. 4. A valve (not shown) is opened to admit pressurized air from a source to port 112 in conventional manner. The pressurized air enters bores 34, 22, 18. Cylinders 36 are thereby spread apart, opening the neck molds, until cylinder sections 40 butt up against the stop nuts 26. As gear 16 is driven in reverse to rotate rock shaft 12 over 180° and transfer the neck molds from the blow mold section back to the blank mold section, slot 35 moves away from port 112. Bore 18 initially remains pressurized because air continues to be introduced into port 112 by the pressurized source, and the cylinders 36 remain spread apart abutting stop nuts 26.

During the reverse rotation, while slot 35 and port 112 are still in overlapping relation, the valve is closed to depressurize port 112. The port now serves as an outlet port. Pressurization and de-pressurization is achieved at appropriate times during displacement of the shaft by a conventional cam timing mechanism which operates the valve. Air is released from bore 18 to port 112 via bores 22, 34 when the port is depressurized. As air is released, springs 48 move the cylinders 36 back towards each other until cylinder sections 40 butt up against annular shoulders 110 on rock shaft 12. For this position of the cylinders, the neck molds are closed.

It should be appreciated that the invention elminates cylinder backlash associated with the splined rock shaft of the prior art. In addition, because the rock shaft 12 is not splined, it is now possible to utilize piston rings to prevent air leakage at the cylindrical interface of the rock shaft and cylinders.

The present invention may be embodied in other specific forms without departing from the spirit or essential attributes thereof and, accordingly, reference should be made to the appended claims, rather than to the foregoing specification, as indicating the scope of the invention.

I claim:

1. A neck ring mechanism for use in an I.S. glass forming machine comprising:
   a rock member adapted to be supported horizontally,
   a pair of spaced cylinders reciprocable on said rock member for movement in opposite directions,
   gear means coupled to said member for oscillating said member and cylinders about the longitudinal axis of said member,
   longitudinal grooves on the periphery of said member,
   a follower in each groove, each follower being supported by one of said cylinders,
   means for adjusting at least one of said followers so that the follower contacts a side wall of an associated groove, and
   said followers and grooves being arranged such that at least one pair of radially adjacent followers contact radially adjacent groove side walls of a cylinder so as to lock the cylinder on said rock member whereby backlash between said cylinder and rock member is eliminated.

2. Neck ring mechanism according to claim 1 wherein said follower is eccentrically mounted and located within an associated groove.

3. Neck ring mechanism according to claim 1 wherein said rock member is provided with one or more annular grooves, and one or more piston rings seated in said annular grooves so as to seal the interface between said rock member and said cylinder.

4. Neck ring mechanism according to claim 1 including an adjustable cylinder stop, and resiliently displacable means for locking said stop into position.

5. Neck ring mechanism according to claim 1 wherein said rock member is provided with a shoulder stop for limiting movement of said cylinder.

6. Neck ring mechanism according to claim 1 wherein at least one of said followers is fixed in position.

7. Neck ring mechanism for use in an I.S. glass forming machine comprising:
   a rock member adapted to be supported horizontally,
   a pair of spaced cylinders reciprocable on said rock member for movement in opposite directions,
   resiliently displaceable means for urging said cylinders towards each other,
   passage means in said members for conducting pressurized fluid so as to impact said cylinders and spread said cylinders apart,
   gear means coupled to said member for oscillating said member and cylinders about the longitudinal axis of said member,
   longitudinal grooves on the periphery of said member,
   a follower in each groove, each follower being supported by one of said cylinders,
   means for adjusting at least one or more of said followers so that the follower contacts a side wall of an associated groove, and
   said followers and grooves being arranged such that at least one pair of radially adjacent followers contact radially adjacent groove side walls of a cylinder so as to lock the cylinder on said rock member whereby backlash between said cylinder and rock member is eliminated.

8. Neck ring mechanism according to claim 7 wherein said follower is eccentrically mounted and located within an associated groove.

9. Neck ring mechanism according to claim 7 wherein said rock member is provided with one or more annular grooves, and one or more piston rings seated in said annular grooves so as to seal the interface between said rock member and said cylinder.

10. Neck ring mechanism according to claim 7 including an adjustable cylinder stop, and resiliently displacable means for locking said stop into position.

11. Neck ring mechanism according to claim 7 wherein said rock member is provided with a shoulder stop for limiting movement of said cylinder.

12. Neck ring mechanism according to claim 7 wherein at least one of said followers is fixed in position.

13. Neck ring mechanism according to claim 1 wherein said follower is a roller.

14. Neck ring mechanism according to claim 1 wherein said follower is a block provided with a face for slidably contacting a sidewall.

15. Neck ring mechanism according to claim 7 wherein said follower is a roller.

16. Neck ring mechanism according to claim 7 wherein said follower is provided with a face for slidably contacting a sidewall.

* * * * *